Figure 1:
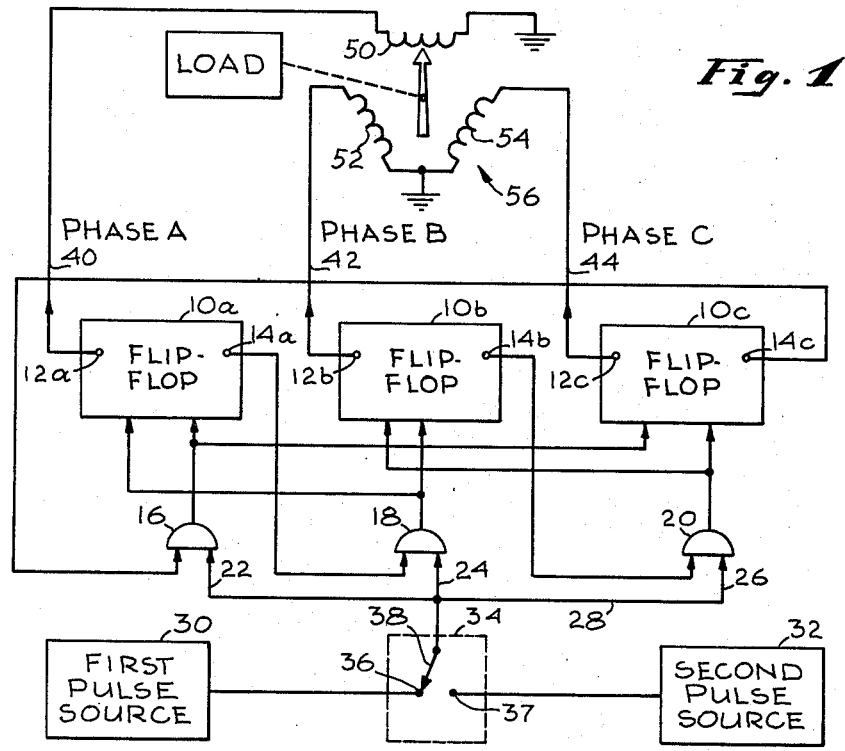

Nov. 26, 1963     A. F. FAIRBANKS     3,112,433

MULTIPHASE ELECTRICAL SYSTEM

Filed Jan. 31, 1962     2 Sheets-Sheet 1

AVARD F. FAIRBANKS
INVENTOR.

BY
*Benjamin DeWitt*
ATTORNEY

AVARD F. FAIRBANKS
INVENTOR.

United States Patent Office 3,112,433
Patented Nov. 26, 1963

3,112,433
MULTIPHASE ELECTRICAL SYSTEM
Avard F. Fairbanks, Canoga Park, Calif., assignor to Space Technology Laboratories, Inc., Los Angeles, Calif., a corporation of Delaware
Filed Jan. 31, 1962, Ser. No. 170,131
6 Claims. (Cl. 318—231)

The present invention relates to multiphase electrical systems, and more particularly to multiphase voltage and/or current generators in which the phase sequence of the output currents is readily reversible.

One of the objects of the present invention is to provide a reversible phase sequence multiphase electrical signal generator.

Another object of the invention is to provide a reversible phase sequence ring counter.

A further object of the invention is to provide for reversing the rotational direction of a multiphase motor without requiring the interruption or switching of circuits which carry the load currents supplied to the motor.

An additional object of the invention is to provide a ring counter circuit capable of driving a step motor indexing mechanism and in which the phase sequence of the counter and hence that of the indexing drive are conveniently reversible.

Another object of the invention is to provide an improved circuit arrangement for selectively driving a multiphase motor or the like in either of two directions.

A further object of the invention is to provide a circuit arrangement for selectively reversing the direction of rotation of a multiphase electric drive motor without switching high current circuits.

In brief, the foregoing and other objects of the invention are attained in the particular embodiment of this invention which is illustrated by provision of a ring counter circuit of three phases embodying three separate flip-flop circuits, and in which only one of the flip-flop circuits may be in the "on" condition at any one time. For normal or forward direction operation of the ring counter circuit, a train of single pulses are applied to a common triggering bus from a source of such pulses, which may be a conventional pulse generating oscillator. To obtain reversal of the phase sequence of the outputs from the three sections of the ring counter, a switch means is provided for connecting the triggering input line to a means for producing a train of groups of pulses, in which train each group of pulses includes a number of individual pulses equal to one less than the number of output phases or the number of stages in the ring counter. In the specific embodiment illustrated, each group of pulses from said means consists of two substantially equal pulses which are so closely spaced in time that, although the ring counter switches twice in response to the two pulses, the multiphase output circuit does not respond to the condition which exists during the time interval between the first pulse and the second pulse of the group. Rather, the output system, which is illustrated as a multiphase alternating current motor, sees only the condition of the ring counter which exists during the relatively long time interval between successive groups of pulses.

Figure 2A:
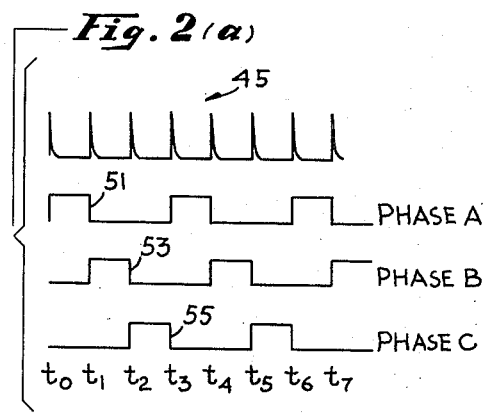
Figure 2B:
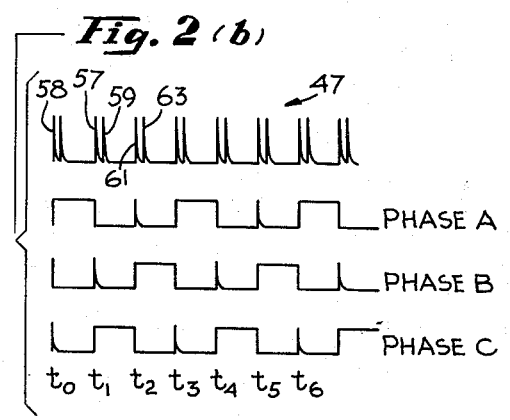
Figure 3:
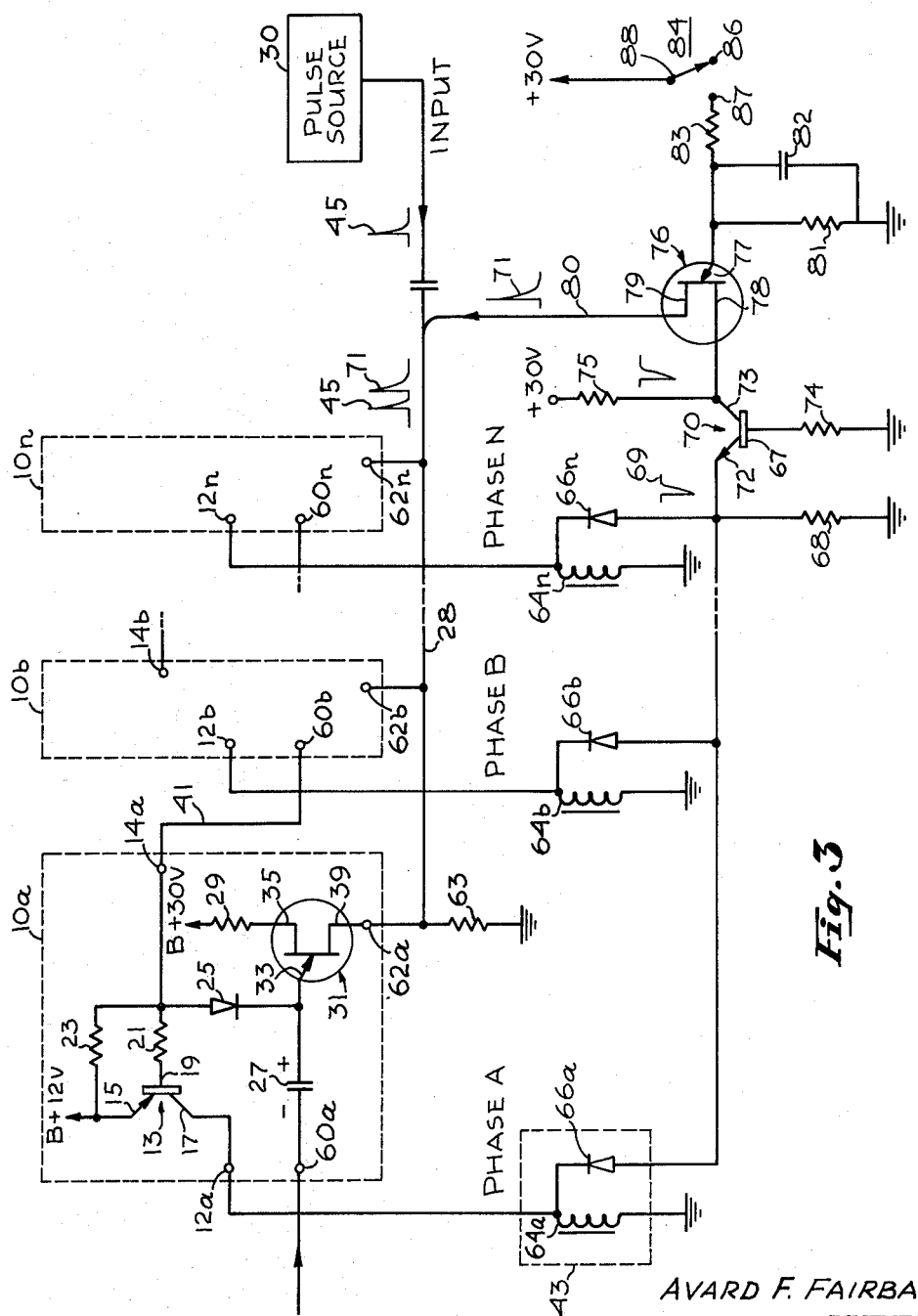

The foregoing and other features and objects of this invention will become more apparent and will be best understood by reference to the following description taken in conjunction with the accompanying drawings, in which:

FIGURE 1 is a block diagram illustrating one embodiment of the invention;

FIGS. 2(a) and 2(b) are graphs of various current waveforms useful in explaining the operation of the apparatus of FIG. 1; and FIG. 3 is a circuit diagram, partially in block diagram form, illustrating a further embodiment of the invention.

Flip-flop circuits per se are well known in the art and are widely used not only in ring counters, but also in shift registers and various other apparatus in the art of storing binary coded information. For example, a transistor ring counter of a type which might be used in one implementation of the present invention is shown by Patent No. 2,984,753, issued May 16, 1961. A vacuum tube ring counter which may be readily adapted to accomplish the present invention is shown by Patent No. 2,975,365, issued March 14, 1961. It is to be understood that the present invention is not limited to any specific form of ring counter or to any particular type of flip-flop circuit, but may utilize a ring counter formed of a plurality of substantially any type of bistable circuits or devices.

One embodiment of the invention is illustrated in FIG. 1, in which a ring counter having three stages 10a, 10b, and 10c is shown. The arrangement is not limited, however, to three stages, since it is possible to use any number of stages depending on the number of electrical phases in the output alternating current system or alternating current load. The stages of the ring counter are identical, and hence only one stage will be described in detail.

As shown in FIG. 1, the three flip-flops have high current output terminals 12a, 12b, and 12c which are connected, respectively, by way of conductors 40, 42, and 44, to the three individual phase windings 50, 52, and 54 of a three-phase alternating current motor 56. In a specific embodiment of the present invention which has been constructed, the motor 56 is a stepper motor or indexing motor having a permanent magnet rotor which aligns itself with the field produced by any one of the windings which is energized. Thus, the motor comprises means for step-positioning or indexing any desired mechanical load. Specifically, a motor manufactured by American Electronics, Inc., Culver City, California, and designated by their style number 11 S 12J–15D, has been successfully used and is mentioned by way of example.

The flip-flop 10a has a second output terminal 14a which is connected to one input of an "and" circuit 18 which has its output connected to the input of the next successive flip-flop circuit 10b. Flip-flop circuit 10a is provided with an "and" circuit 16 which has its first input connected to the second output 14c of the last flip-flop 10c of the counter. Similarly, an "and" circuit 20 is associated with the third flip-flop 10c and has its first input connected to the second output 14b of flip-flop 10b and has its output connected to the input of flip-flop 10c. The second inputs of the "and" circuits 16, 18, and 20 are commonly connected to a triggering signal input bus designated by the numeral 28. For normal phase squence or "forward" rotational operation of the motor 56, the trigger signal input bus 28 is connected to a first source of input signals 30 by way of a first terminal 36 and the movable arm 38 of a selector switch mechanism 34. Source 30 provides a train of single input pulses having a predetermined repetition rate which, in the particular embodiment illustrated, is three times the frequency of the alternating current wave which is to be delivered to one phase of the output system. That is, for example, if the motor 56 is designed to be driven by a 60-cycle three-phase alternating current line, then the output frequency or repetition rate of the pulse source 30 should be 180 cycles per second.

For reverse phase sequence operation of the ring counter 10a, 10b, and 10c, so as to generate a reverse phase sequence multiphase A.C. output, there is provided a second source of input signals 32 connected to a second terminal 37 of the selector switch 34 and therefore connectable to the input bus 28 by positioning the movable switch arm 38 to contact terminal 37.

The normal operation of the ring counter of FIG. 1 is illustrated in FIG. 2(a), wherein the pulses 45 represent the output from the first pulse source 30, and the waveforms designated by "phase A," "phase B," and "phase C" represent, respectively, the current waveforms delivered to the three-phase conductors 40, 42, and 44 of the output line of FIG. 1. With reference to FIG. 2(a), for clarity of description, it is assumed that the first pulse 45 occurring at time $t_0$ switches the first flip-flop 10a to the "on" or conductive condition. The pulse 51 designates the current in the phase A conductor 40 during the time $t_0$–$t_1$. At time $t_1$, the second pulse in the pulse train 45 switches flip-flop 10a to the "off" condition and flip-flop 10b to the "on" condition so that the current in phase conductor 42 rises from zero to a maximum as designated by the numeral 53. Thus phase B of the output load 56 is energized during the time interval $t_1$–$t_2$. Similarly, the third pulse in the pulse train 45 switches flip-flop 10b to the "off" condition and switches flip-flop 10c to the "on" condition, and the current in output conductor 44 rises to a maximum as designated at 55 during the time interval $t_2$–$t_3$. Thus it is seen that the three-phase output current delivered to the load 56 has a normal phase sequence ABC, ABC . . .

Reverse phase sequence operation of the ring counter in response to receipt of input signal from source 32 is illustrated in FIG. 2(b), wherein 47 designates the train of groups of pulses provided by the source 32. With reference to FIG. 2(b), it is first assumed that the first group of pulses 58 of the pulse train 47 switches the first flip-flop 10a to the "on" condition so that the output current in phase conductor 40 is at a maximum during the time interval $t_0$–$t_1$. At the time $t_1$, the first pulse 57 of the second group of pulses switches the first flip-flop 10a to the "off" condition and switches the second flip-flop 10b to the "on" condition for a very short time corresponding to the time spacing between the pulses 57 and 59 of the second group. The second pulse 59 of the second group switches flip-flop 10b to the "off" condition and switches flip-flop 10c to the "on" condition. The flip-flop 10b is in the "on" condition only for the inter-pulse time between the pulses 57 and 59, and therefore flip-flop 10b produces only a transient output current at conductor 42. That transient output is of such short duration and such little power that the phase winding 52 of the motor 56 does not respond thereto; that is, although the ring counter switches so that stage 10b is transiently in the "on" condition, the output load 56 does not respond to that output from stage 10b. The output load 56 sees only the condition of the ring counter during the relatively long interval between successive groups of pulses. As stated above, the second pulse 59 of the second group switches flip-flop 10b to the "off" condition and switches the third flip-flop 10c to the "on" condition. Accordingly, during the time interval $t_1$–$t_2$, flip-flop 10c provides a maximum output current by way of phase conductor 44, thereby energizing the third phase winding 54 of the load 56. At time $t_2$, pulse 61, which is the first pulse of the third group, switches flip-flop 10c to the "off" condition and transiently switches flip-flop 10a to the "on" condition. Immediately thereafter, pulse 63, which is the second pulse of the third group, switches flip-flop 10a to the "off" condition and switches flip-flop 10b to the "on" condition, so that during the time interval $t_2$–$t_3$ flip-flop 10b provides a maximum output current by way of the phase B conductor 42 to energize the second phase winding 52 of the output load. Similarly, at time $t_3$ the fourth group of pulses switches flip-flop 10c to the "on" condition and then to the "off" condition and switches flip-flop 10a to the "on" condition so that the phase A conductor 40 is energized during the time period $t_3$–$t_4$. Thus, by consideration of FIG. 2(b), it is seen that when the trigger signal input bus 28 is connected to receive input signals from source 32, the effective phase sequence of the output power delivered to load 56 from the ring counter is ACBA, CBA . . .

It will be observed that the ring counter does not actually operate in the reverse direction. Rather, it operates through $n-1$ stages in response to each group of $n-1$ pulses. Accordingly, during the successive time periods between groups of input pulses, the "on" condition effectively moves around the ring counter in the reverse direction so that reverse phase sequence output power is supplied to the motor 56, and the motor will rotate in the reverse direction or clockwise direction, as shown in FIG. 1.

FIG. 3 illustrates a further embodiment of the present invention, wherein one of the flip-flops 10a is shown in detail as comprising a switching transistor 31, a buffer or output transistor 13, and a semiconductor diode 25. The buffer transistor 13 has its emitter electrode 15 connected to a source of +12 volts and has its collector electrode 17 connected by way of output terminal 12a to a load 43, which may, of course, comprise one phase winding of a multiphase A.C. motor or may comprise one phase conductor of a multiphase power transmission line. The base electrode 19 is connected through series resistors 21 and 23 to the 12-volt potential source. The junction point between resistors 21 and 23 is connected by way of the second output terminal 14a and conductor 41 to the second input terminal 60b of the second flip-flop 10b. The junction point between resistors 21 and 23 is further connected by way of diode 25 to the emitter electrode 33 of the switching transistor 31. The first base electrode 39 of the switching transistor 31 is connected to the input terminal 62a and thereby to the trigger signal input bus 28. The second base electrode 35 of the switching transistor is connected through a current limiting resistor 29 to a +30 volt potential source.

The operation of the single flip-flop circuit 10a as detailed in FIG. 3 is substantially as follows. First assume that flip-flop 10a is "on," so that load 43 is energized from the +12 volt source by way of the emitter-collector current path of transistor 13. Now, an input pulse applied from trigger signal input bus 28 to terminal 62a switches the switching transistor 31 "off" so that current flow through diode 25 and the emitter-base path 33—39 is terminated. With cessation of current flow through resistor 21 and diode 25, the junction point between resistors 21 and 23 immediately rises to +12 volts so that a positive pulse is applied by way of output terminal 14a and conductor 41 to the input terminal 60b of the next stage to turn the next stage 10b "on." Both switching transistor 31 and the buffer amplifier transistor 13 are now "off." It should be observed that the "and" function of element 16 of FIG. 1 is provided integrally in the flip-flop of FIG. 3. Specifically, in FIG. 3, when switching transistor 31 is "on," stages 10b . . . 10n are "off." Accordingly, they are non-responsive to input pulses on the bus 28. When an input pulse is applied at 60b (as a result of the preceding stage 10a being switched to "off"), stage 10b is triggered to the "on" or conductive condition.

The foregoing description of the operation of the flip-flop 10a has been set forth as briefly as possible in view of the fact that the particular flip-flop circuit is merely illustrative of one arrangement which has been successfully used. It is to be understood that the present invention does not depend upon any particular flip-flop circuit. It is contemplated and intended that practically any conventional flip-flop or bistable element, whether vacuum tube, transistor, ferrite core, or other, may be adapted for use in a ring counter operating in accordance with the teachings of the present invention.

Departing now from consideration of the internal structure of the flip-flop 10a, there is a further feature of the embodiment of FIG. 3 which deserves attention. The embodiment of FIG. 3 dispenses with the need for a separate input signal source as designated by the numeral 32 in FIG. 1, and instead uses a feedback arrangement for generating a group of $n-1$ pulses at bus 28 in response to application of a single triggering pulse from source 30. More exactly, as shown in FIG. 3, the $n$-phase load comprises inductors 64a, 64b . . . 64n connected respectively to the output terminals 12a, 12b . . . 12n of the $n$-phase ring counter. Each inductor 64a, 64b, etc. is shunted by a semiconductor diode 66a, 66b, etc., and a commonly connected series resistor 68. When the inductor 64a, for example, is energized, the diode 66a is reverse biased and does not conduct. When flip-flop 10a switches to the "off" condition, current flow therefrom to inductor 64a is abruptly terminated, and the collapsing field of inductor 64a produces an inductive "kick" pulse of current through diode 66a and resistor 68. Each one of the phase inductors $64b \ldots 64n$ produces a similar current pulse through resistor 68 when their associated flip-flops are switched to the "off" condition. Thus, across resistor 68 there appears a train of pulses having the same repetition rate as the input pulses 45, but with each negative pulse 69 at the resistor 68 being slightly delayed in time relative to the corresponding input pulse 45. The negative going pulse 69 is applied from resistor 68 to the emitter electrode 72 of a transistor 70 which has its base electrode 67 connected to ground through a current limiting resistor 74 and which has its collector electrode 73 connected to a source of +30 volts through a load resistor 75. The input pulse 69 applied to emitter 72 transiently increase the conductivity of transistor 70, thereby generating a corresponding negative going pulse across load resistor 75. The lower end of resistor 75 is connected to a second base electrode 78 of a switching transistor 76 which has its first base electrode 79 connected by way of conductor 89 to the trigger signal bus 28. The emitter electrode of switching transistor 76 is connected to ground through a resistor 81 shunted by a capacitor 82, and is further connected through a resistor 83 to one contact 87 of a two-position switch 84. Switch 84 has its movable arm 88 connected to the +30 volt direct current source. When switch 84 is in the position as shown, no energizing potential is applied to capacitor 82 or the emitter 77, and accordingly switching transistor 76 remains in its "open" or non-conductive condition at all times so that the train of pulses 69 are not transmitted through the switching transistor 76 and do not appear on the trigger signal bus 28. Thus, with switch 84 "open" (as shown), the signal at bus 28 is the normal train of single pulses from source 30, as described heretofore in connection with FIG. 1. Accordingly, with switch 84 "open," the ring counter will operate in the normal or forward phase sequence and will provide the normal phase sequence AB ... N, AB ... N energization of the multiphase load $64a, 64b \ldots 64n$. When switch 84 is positioned to close the circuit from the +30 volt source through resistor 83 to the emitter 77, the capacitor 82 charges to about +12 volts. Accordingly, when a pulse 69 is transmitted from resistor 68 through the transistor 70 and appears at base electrode 78, the switching transistor 76 becomes instantaneously conductive, and a positive pulse of current flows from capacitor 82 through emitter 77 and base 79 to the trigger signal bus 28. As illustrated in FIG. 3, the pulse 71 from switching transistor 76 appears on the trigger signal bus 28 at a time shortly after the appearance of the input pulse 45. That is necessarily true because input pulse 45 initiates the transient at load inductor 64a, which transient is responsible for the generation of the feedback pulses 69 and 71. Thus the feedback circuit including transistors 70 and 76 operates to create a group of two pulses 45, 71 at the trigger signal bus 28 in response to application of a single input pulse 45 from the pulse source 30.

The RC network, consisting of resistor 81 shunted by capacitor 82 and connected in series with resistor 83 to the +30 volt source, preferably has a charging time constant which is at least somewhat shorter than the repetition period of the pulse source 30 and which is at least somewhat longer than the time interval between the pulses 45 and 71. With such a time constant, the capacitor 82 may recharge sufficiently during the time between the pulses 45 from source 30 to permit generation of a single pulse 71 in response to each pulse 45. Likewise, the time constant is long enough so that only a single pulse 71 is generated in response to each input pulse 45. That is, when input pulse 45 triggers flip-flop 10a, for example, and an inductive "kick" is generated through diode 66a, capacitor 82 is sufficiently charged so that switching transistor 76 is operative and produces the feedback pulse 71 at its output conductor 80. However, immediately after the generation of the feedback pulse 71, capacitor 82 then remains at low charge for a long enough time so that a successive pulse generated by inductor 64b will not be transmitted through the switching transistor 76. Thus, the time constant, which is long relative to the time period between the pulses 45 and 71, prevents "time race" or free-running oscillation in the ring counter. In the specific three-phase embodiment illustrated in FIG. 3, a single feedback circuit comprising switching transistor 76 and its associated time constant circuit is all that is needed because only a single feedback pulse needs to be generated in response to each input pulse. It will be understood that in a ring counter incorporating $n$ stages and $n$ output phases it is necessary to provide $n-1$ feedback circuits comprising $n-2$ switching transistors similar to the transistor 76 of FIG. 3, and with each of the $n-2$ switching transistors having associated with it a separate RC circuit. The group of $n-1$ pulses, which in the specific embodiment shown comprises the pulse 45 and the pulse 71, is operative to cause apparent reverse phase sequence operation of the ring counter. That is, as described heretofore with reference to FIG. 1, a train of groups of pulses at trigger signal bus 28, with each group in the train comprising $n-1$ pulses, is operative to cause reverse phase sequence CBA, CBA ... energization of the output load.

While there have been described what are at present considered to be preferred embodiments of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. In combination:
    a ring counter including $n$ bistable flip-flop circuits each having a first output coupled individually to energize one phase conductor of an n-phase alternating current load, each of said flip-flop circuits being coupled to a common drive signal line and being responsive to a drive pulse on said line to change to a first stable state only when the preceding flip-flop is in said first stable state; and
    first and second alternatively selectable sources of drive signal;
    said first source comprising means for providing a train of single pulses time-separated by inter-pulse dwell periods larger than the pulse duration time;
    said second source comprising means for providing a train of transilient pulse groups with the groups being time-separated by inter-group dwell periods larger than the group duration time and with each group including $n-1$ distinct pulse maxima of sufficient magnitude to actuate said ring counter, whereby upon selection of said first source said ring counter applies normal phase sequence voltages to said load and upon selection of said second source applies effective reverse phase sequence voltages to said load.
2. In combination:
    a motor having $n$ windings for producing $n$ equiangularly spaced fields and a rotor movable in response to said fields;
    a ring counter including $n$ bistable flip-flops each having a first output coupled to one of said windings for energizing the same when in a first stable state, each of said flip-flops being coupled to a common drive signal line and being responsive to a drive pulse on said line to change to said first stable state only when the preceding flip-flop is in said first stable state; and first and second alternatively selectable sources of drive signal;

said first source comprising means for providing a train of single pulses time-separated by inter-pulse dwell periods larger than the pulse duration time;

said second source comprising means for providing a train of transilient pulse groups with the groups being time-separated by inter-group dwell periods larger than the group duration time and with each group including $n-1$ distinct pulse maxima of sufficient magnitude to actuate said ring counter, whereby selection of said first source causes said ring counter to drive said motor in a first rotational direction and selection of said second source results in apparent reverse sequence operation of said ring counter so that said motor is driven in the opposite rotational direction.

3. In combination:

a motor having $n$ windings for producing $n$ equiangularly spaced fields and a rotor movable in response to said fields;

a plurality of $n$ bistable devices each having first and second output and first and second input terminals;

means individually coupling said first output terminals to separate ones of said windings so that a given winding is energized only when the corresponding bistable device is in a first stable state;

coupling means connected between the second output terminal of each bistable device and the first input terminal of the next adjacent bistable device for rendering the same responsive to input signals only when the preceding bistable device is in said first stable state so that only the bistable device immediately following the one which is in said first stable state is shifted from a second stable state to the first stable state in response to an input signal;

first and second sources of input signals; and selector means for alternatively applying input signals from one or the other of said sources to all said second input terminals simultaneously;

said first input signal source comprising means for providing a train of single pulses having a predetermined pulse repetition rate so that when said selector means is conditioned to apply said train of single pulses to said second input terminals, said first stable state moves from one bistable device to the next in response to each pulse, whereby said motor windings are energized in a first sequential order;

said second input signal source comprising means for producing a train of groups of pulses, with the group repetition rate being substantially equal to the pulse repetition rate of said first source and with each group comprising $n-1$ distinct pulses so that when said selector means is conditioned to apply said train of pulse groups to said second input terminals, said first stable state moves through $n-1$ bistable devices in response to each pulse group and dwells during the inter-group period at the bistable device immediately preceding the one which was in the first stable state prior to the arrival of that pulse group, whereby said motor windings are successively energized during the inter-group periods in a second sequential order which is the reverse of said first sequential order.

4. In combination:

a plurality of counting stages, each stage including a semiconductor device having a conductive state of operation and a non-conductive state of operation and which is electrically coupled to the other stages in a manner such that only one semiconductor device at a time will assume the conductive state of operation;

means to selectively apply time-spaced single pulses having a predetermined pulse repetition rate to a commonly connected input circuit of all said stages for switching successive ones of said semiconductor devices to the conductive state; and means to selectively apply groups of pulses to said input line with each group consisting of a number of pulses equal to one less than the number of said counting stages and with the group repetition rate being substantially the same as said pulse repetition rate, whereby the apparent counting direction is selectively reversed.

5. A control circuit for a motor having $n$ stator windings producing fields equiangularly spaced from each other and a rotor which aligns itself with said fields, said circuit comprising:

a ring counter including $n$ flip-flops each having first and second stable states, each flip-flop having first and second input terminals and first and second output terminals, with said first output terminals individually connected to different ones of said windings, and with all said first input terminals commonly connected to a signal input selector means, and with said second output terminals connected respectively to the second input terminals of the next adjacent flip-flop in a manner such that only one flip-flop at a time will assume the first stable state of operation in which it energizes the corresponding stator winding; and first and second input signal sources coupled to said input selector means and alternatively selectable thereby for applying flip-flop selector means and alternatively selectable thereby for applying flip-flop actuating signals to said commonly connected first input terminals;

said first source comprising means to provide a train of single pulses for successively switching said flip-flops whereby said motor is driven in a first angular direction, and said second source comprising means to provide a train of groups of relatively closely spaced pulses, with each group including a number of pulses equal to one less than the number of said flip-flops for successively switching all but one of said flip-flops in a manner such that said motor is driven in a second angular direction at a rotational speed corresponding to the repetition rate of said groups of pulses.

6. A control circuit for a motor having $n$ stator windings producing fields equiangularly spaced from each other and a rotor which aligns itself with said fields, said circuit comprising:

a ring counter including $n$ bistable devices each having first and second stable states, each bistable device having first and second input terminals and first and second output terminals, with said first output terminals individually connected to different ones of said windings, and with all said first input terminals being commonly connected, and with said second output terminals connected respectively to the second input terminals of the next adjacent bistable device in a manner such that only one bistable device at a time will assume the first stable state of operation in which it energizes the corresponding stator winding;

input signal selector means coupled to said commonly connected first input terminals; and first and second input signal sources coupled to said input selector means and alternatively selectable thereby for applying actuating signals to said commonly connected first input terminals;

said first source comprising means to provide a train of single pulses for successively switching said bistable devices whereby said motor is driven in a first angular direction, and said second source comprising means to provide a train of pulse groups in which each group consists of $n-1$ pulses and in which time-successive pulse groups are separated by inter-group dwell periods, for successively switching said bistable devices in a manner such that during successive inter-group dwell periods the first stable state moves around said ring counter in a direction to drive said motor in the reverse angular direction.

References Cited in the file of this patent

UNITED STATES PATENTS

| | | |
|---|---|---|
| 2,791,734 | Kieffert | May 7, 1957 |
| 3,009,089 | Collins | Nov. 14, 1961 |
| 3,065,397 | Crawford | Nov. 20, 1962 |

FOREIGN PATENTS

| | | |
|---|---|---|
| 166,287 | Australia | Dec. 9, 1955 |